United States Patent [19]

Kidney

[11] 4,311,883
[45] Jan. 19, 1982

[54] MODULAR TELEPHONE JACK LOCK

[76] Inventor: Susan L. Kidney, 95 S. Grove St., Apt. 2-E, Valley Stream, N.Y. 11580

[21] Appl. No.: 128,396

[22] Filed: Mar. 10, 1980

[51] Int. Cl.³ .............. E05B 73/00; H01R 13/60; H04M 1/66
[52] U.S. Cl. .............................. 179/189 R; 70/57; 70/DIG. 72; 339/37
[58] Field of Search ............... 179/189 R, 14, 1 PC; 339/37, 82; 200/44; 70/61, DIG. 72, 58, 57

[56] References Cited

U.S. PATENT DOCUMENTS 2,759,492  8/1956  Benson et al. ............... 339/37 X
2,955,272 10/1960  Gallardo ....................... 339/37

FOREIGN PATENT DOCUMENTS 1167935  4/1964  Fed. Rep. of Germany ........ 339/37
2821456 11/1979  Fed. Rep. of Germany ... 179/189 R Primary Examiner—Thomas W. Brown
Attorney, Agent, or Firm—Richard L. Miller

[57] ABSTRACT

A lock designed specifically to lock up a plug-in socket of a modular type telephone; the lock including a jack that snap locks into the socket, a key-operated bolt for unlocking the jack therefrom, and an integral clamp for selectively clamping around the extension cord extending from a telephone desk set for securing the same from theft.

6 Claims, 3 Drawing Figures

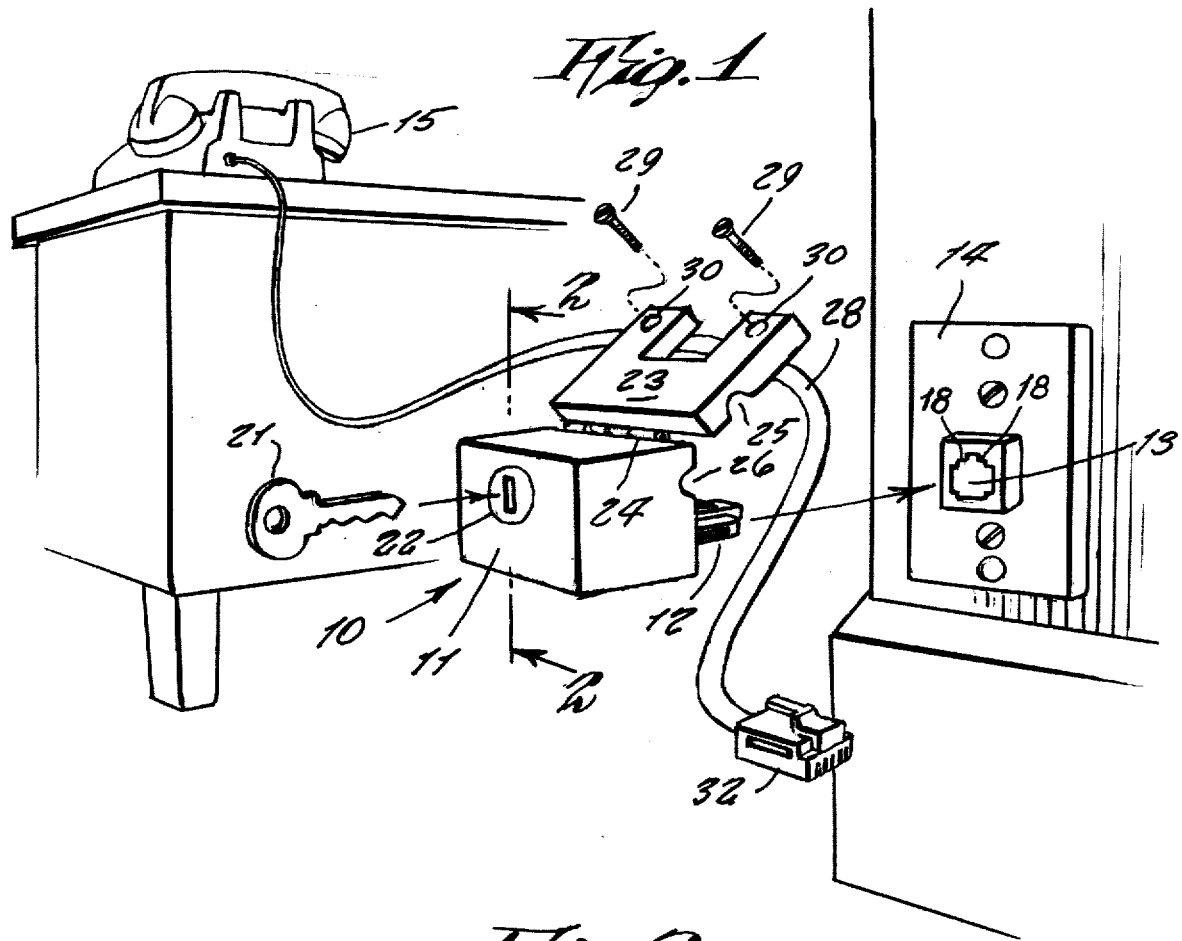
Fig. 1
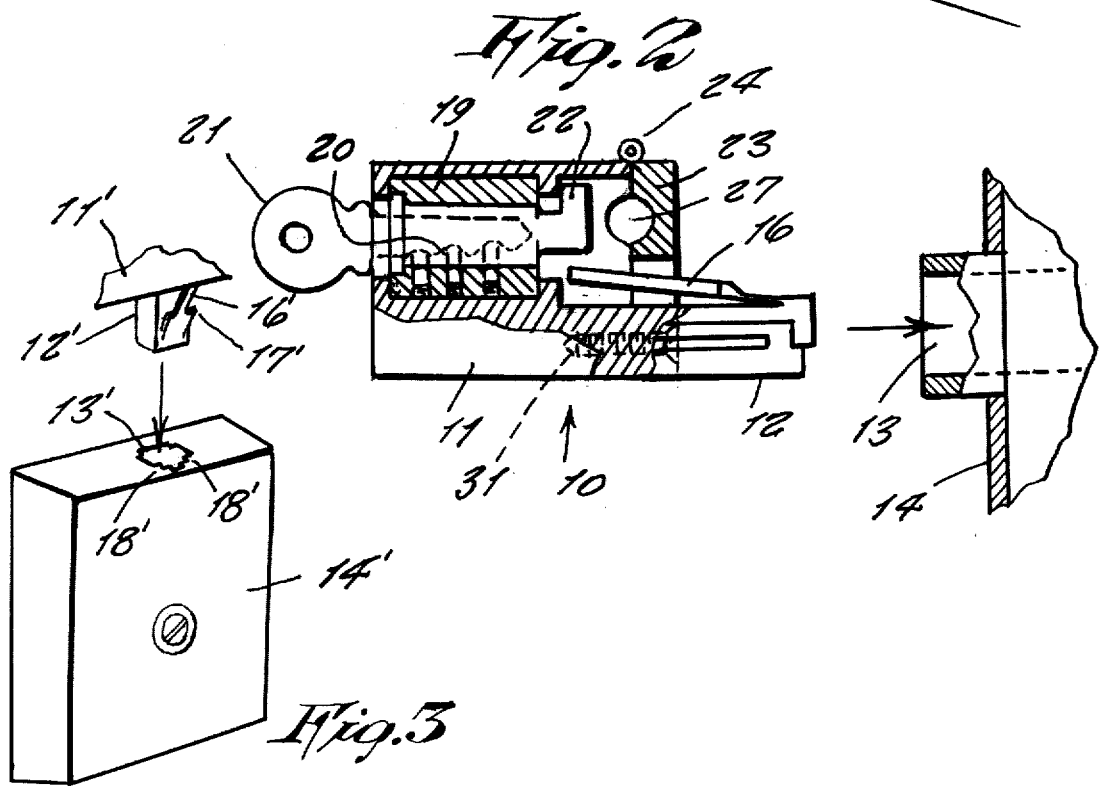
Fig. 2
Fig. 3

4,311,883

MODULAR TELEPHONE JACK LOCK

BACKGROUND OF THE INVENTION

This invention relates generally to telephone accessories, and more particularly to the recently developed, modular type telephones that have a single jack for plugging into a single opening of a wall-mounted socket.

It is well known that considerable misuse of a telephone occurs, especially in business firms where unauthorized persons use the company telephones for making their own personal telephone calls so that the firm is obliged to pay for them. This situation is objectionable and is therefore in need of an improvement.

SUMMARY OF THE INVENTION

Therefore it is a principal object of the present invention, to provide a lock for locking up the conventional wall-mounted socket, installed by a telephone company, so as to prevent a telephone hand set or desk set from being plugged therein for telephone use.

Another object is to provide a lock which additionally serves to protect an unplugged desk set from being stolen from a premises by means of clamping the desk set extension cord thereto.

Yet a further object is to provide a lock that is key-operated so as to be for personal use, and which is small in size so that when the lock is not in use, it may be carried in a person's pocket.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The FIGS. on the drawings are briefly described as follows:

FIG. 1 is a perspective view of the invention shown positioned for installation.

FIG. 2 is a side view thereof shown partly in cross section.

FIG. 3 illustrates the invention being used with an external wall receptacle.

DETAILED DESCRIPTION OF PREFERRED EMBODIMENT

Referring now to the drawing in greater detail, the reference numeral 10 represents a modular telephone jack lock according to the present invention, wherein there is a hard plastic case 11 from a rear side of which a plug 12 extends for insertion into a plug-in opening 13 of a conventional, wall-mounted socket 14 of a modern modular type telephone, wherein a single plug in a single opening provides connection of a desk set 15 with a telephone company system.

The plug 12 includes a leaf spring component 16 having corners 17 that lock behind corners 18 of the socket opening 13 so that when inserted, the plug snap-fits therein and automatically locks thereto. A lock mechanism 19 with pins 20 inside the case, is operated by a removable key 21 so as to rotate a bolt 22 of the lock and depress the leaf spring component so that the corners thereof clear the corners of the socket opening in order to permit removal of the lock 10 from the socket.

In the present invention, a clamp 23 is pivotally secured by a hinge 24 to the case and is pivotable against a rear side thereof so that a semi-cylindrical notch 25 of the clamp aligns with a semi-cylindrical notch 26 transversely across a rear side of the case so that they together form a cylindrical hole 27 in which an extension cord 28 of the desk set may be placed for securement against theft of the desk set. After the extension cord is thus seated and the clamp pivoted down against the case rear side, two screws 29 may be inserted through clearance holes 30 in the clamp and into threaded holes 31 in the case so as to capture the extension cord safely and prevent theft thereof. It also should be particularly noted that the screws are inaccessible for removal due to the abutting of the face of the socket when the lock 10 is mounted in the socket.

Thus there is provided a lock which prevents a plug 32 on an extension cord of a desk set from being plugged into a socket opening 13 by unauthorized persons and also prevents a desk set from being carried away.

FIG. 3 shows the application of the present invention for an externally mounted plug-in opening 13' that is upon the top of a wall socket 14'. The hard plastic case 11' in this use of the invention is similarly provided with a plug 12' having a leaf spring component 16' extending downwardly and perpendicularly to the plastic case 11'. The leaf spring 16' has corners 17' for locking engagement with corners 18' of the opening 13' in a manner similar to that described above.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A modular telephone jack lock, comprising in combination, a case, said case including a clamp for locking an extension cord of a desk-set therein when said plug is engaged in a socket opening; a plug protruding from a rear of said case for snap-fitting into the socket opening of a modular telephone system; and a lock mechanism inside said case for unlocking said plug from said socket opening.

2. The combination as set forth in claim 1, wherein said lock is operated by a removable key, and conveniently fits in a person's pocket when not in use.

3. The modular telephone jack lock according to claim 1, wherein said clamp for locking an extension cord is pivotally mounted at the rear of said case and has a semi-cylindrical notch on the rear surface thereof, the rear of said case also having a semi-cylindrical notch in alignment with said semi-cylindrical notch of said clamp when said clamp is pivotted to its closed position abutting against the rear of said case, whereby an extension cord inserted in said semi-cylindrical notches is locked in place thereby when said clamp is closed to its position in abutting relation with the rear of said case.

4. The modular telephone jack lock according to claim 3, wherein said clamp has at least one hole formed therethrough, and the rear of said case has at least one threaded hole formed therein, said at least one hole being aligned when said clamp is in its closed position, whereby said clamp and the rear of the case may be locked together by a screw when the clamp is in its closed clamping position.

5. The modular telephone jack lock according to claim 1, wherein said lock mechanism inside said case comprises a spring having a first end affixed to said plug, and a second free end remote from said first end extending toward the front of the case, said spring projecting through said clamp when said clamp is in its closed position.

6. The modular telephone jack box according to claim 5, wherein said spring is a leaf spring, and said second free end thereof extends into the interior of said case; said lock mechanism further comprising a rotatable bolt mounted within the interior of said case, said rotatable bolt being movable from a first position remote from said second free end of said leaf spring, to a second position in contact with said second free end whereby said second free end is depressed to thereby release the plug from the socket opening.

* * * * *